United States Patent [19]

Hodge

[11] Patent Number: 4,636,944
[45] Date of Patent: Jan. 13, 1987

[54] MULTI-LEVEL PRIORITY MICRO-INTERRUPT CONTROLLER

[75] Inventor: James E. Hodge, Middletown, N.J.

[73] Assignee: Concurrent Computer Corporation, Holmdel, N.J.

[21] Appl. No.: 571,607

[22] Filed: Jan. 17, 1984

[51] Int. Cl.[4] .............................................. G06F 9/46
[52] U.S. Cl. ................................................... 364/200
[58] Field of Search ... 364/200 MS File, 900 MS File

[56] References Cited

U.S. PATENT DOCUMENTS

| 3,829,839 | 8/1974 | Jeane | 364/200 |
|---|---|---|---|
| 3,905,025 | 9/1975 | Davis et al. | 364/200 |
| 3,909,797 | 9/1975 | Goss et al. | 364/200 |
| 4,275,458 | 6/1981 | Khera | 364/900 |
| 4,398,244 | 8/1983 | Chu et al. | 364/200 |
| 4,471,426 | 9/1984 | McDonough | 364/200 |

FOREIGN PATENT DOCUMENTS

0111407  6/1984  European Pat. Off. .

Primary Examiner—Eddie P. Chan
Attorney, Agent, or Firm—E. T. Grimes; F. L. Masselle

[57] ABSTRACT

A multi-level priority micro-interrupt controller for a micro-program controlled computer handles a plurality of interrupt signals at a plurality of levels of priority, wherein only one interrupt signal for each level of priority may be active at any moment. When an interrupt occurs which has a higher priority than that of the interrupt currently being handled, the control store address of the next instruction to be executed is stacked and the interrupt handler subroutine for the higher priority interrupt is initiated. When an interrupt occurs which has a lower priority than that of the interrupt currently being handled, it is queued. After an interrupt has been handled, the stack is popped and execution is resumed at the control store address at the top of the stack. The control store address of the interrupt handler subroutine for a particular interrupt is decoded from the interrupt signals in two parts, the second part also being used to control the branching to the interrupt handler subroutine.

4 Claims, 7 Drawing Figures

FIG. 1

| Micro-instruction being executed | Stack (inside sequencer) TOP / TOP-1 / TOP-2 | Interrupt Inputs (LEVEL 0, LEVEL 1, LEVEL 2, RLV 00, RLV 10, RLV 20) | Interrupt Status (IS 00, IS 01, IS 12, IS 10, IS 11) |
|---|---|---|---|
| NORMAL PROCEDURE | | | |
| 100 | | | |
| 101 | | | |
| 103 | | | |
| 104 | | | |
| 105 | | LEVEL 1 | |
| INTERRUPT LEVEL GENERATED | | | |
| SERVICE INTERRUPT, PUSH STACK | | | |
| 800 | 106 | | |
| 801 | 106 | | |
| 802 | 106 | | |
| 803 | 106 | | |
| 804 | 106 | RLV 10 | |
| END SERVICE RESET LEVEL POP STACK | | | |
| 106 | | | |
| 107 | | | |
| 108 → | | | |

NOTE: 1 MEANS SIGNAL IS TRUE.

| MICRO-INSTRUCTION BEING EXECUTED | STACK (INSIDE SEQUENCER) | | | INTERRUPT INPUTS | | | | | | INTERRUPT STATUS | | | | |
|---|---|---|---|---|---|---|---|---|---|---|---|---|---|---|
| | TOP | TOP-1 | TOP-2 | LEVEL 0 | LEVEL 1 | LEVEL 2 | RLY 00 | RLY 10 | RLY 20 | IS 10 | IS 11 | IS 21 | IO 10 | IO 11 |
| NORMAL PROCEDURE | | | | | | | | | | | | | | |
| 100 | | | | | | | | | | | | | | |
| 101 | | | | | 1 | | | | | | | | | |
| 103 | | | | | | | | | | | 1 | | | |
| 104 | | | | | | | | | | | 1 | | | |
| INTERRUPT LEVEL 1 GENERATED | | | | | | | | | | | | | | |
| SERVICE LEVEL 1, PUSH STACK | | | | | | | | | | | | | | |
| 800 | 105 | | | | | | | | | | 1 | | | |
| 801 | 105 | | | | | | | | | | 1 | | | |
| 802 | 105 | | | | | | | | | | 1 | | | |
| 803 | 105 | | | | | | | | | | 1 | | | |
| 804 | 105 | | | | | | | 1 | | | 1 | | | |
| INTERRUPT LEVEL 0 GENERATED | | | | | | | | | | | | | | |
| SERVICE LEVEL 0 INTERRUPT | | | | | | | | | | | | | | |
| END SERVICE 1, RESET 1, POP STACK | | | | | | | | | | | | | | |
| SERVICE LEVEL 0, PUSH STACK | | | | | | | | | | | | | | |
| 700 | 105 | | | | | | | | | 1 | | | | |
| 701 | 105 | | | | | | | | | 1 | | | | |
| 702 | 105 | | | | | | | | | 1 | | | | |
| 703 | 105 | | | | | | | | | 1 | | | | |
| END SERVICE 0, RESET 0, POP STACK | | | | | | | | | | | | | | |
| 704 | 105 | | | | | | | | | 1 | | | | |
| 105 | | | | | | | | | | | | | | |
| 106 → | | | | | | | | | | | | | | |

NOTE: 1 MEANS SIGNAL IS TRUE.

| MICRO-INSTRUCTION BEING EXECUTED | STACK (INSIDE SEQUENCER) TOP | TOP-1 | TOP-2 | INTERRUPT INPUTS LEVEL 0 | LEVEL 1 | LEVEL 2 | RLV 00 | RLV 01 | RLV 02 | INTERRUPT STATUS IS 10 | IS 11 | IS 12 | IO 101 | IO 11 |
|---|---|---|---|---|---|---|---|---|---|---|---|---|---|---|
| NORMAL PROCEDURE | | | | | | | | | | | | | | |
| 100 | | | | | | | | | | | | | | |
| 101 | | | | | 1 | | | | | | | | | |
| 103 | | | | | | | | | | | | | | |
| 104 | | | | | | | | | | | | | | |
| INTERRUPT LEVEL 1 GENERATED | | | | | | | | | | | | | | |
| SERVICE LEVEL 1, PUSH STACK | | | | | | | | | | | | | | |
| 800 | 105 | | | | | | | | | | 1 | | | |
| 801 | 105 | | | | | | | | | | 1 | | | |
| INTERRUPT LEVEL 2 GENERATED | | | | | | | | | | | | | | |
| SERVICE LEVEL 2, PUSH STACK | | | | | | | | | | | | | | |
| 802 | 803 | 105 | | | | 1 | | | | | 1 | | | |
| 900 | 803 | 105 | | | | | | | | | 1 | 1 | | |
| 901 | 803 | 105 | | | | | | | | | 1 | 1 | | |
| INTERRUPT LEVEL 0 GENERATED | | | | | | | | | | | | | | |
| QUEUE LEVEL 0 | | | | | | | | | | | | | | |
| 902 | 803 | 105 | | 1 | | | | | | | 1 | 1 | | |
| 903 | 803 | 105 | | | | | 1 | | | | 1 | 1 | 1 | |
| 904 | 803 | 105 | | | | | | | | | 1 | 1 | 1 | |
| END SERVICE 2, RESET 2, POP STACK | | | | | | | | | | | | | | |
| RESUME SERVICE 1 | | | | | | | | | | | | | | |
| 803 | 105 | | | | | | | | | | 1 | | 1 | |
| 804 | 105 | | | | | | | | | | 1 | | 1 | |
| END SERVICE 1, RESET 1, POP STACK | | | | | | | | | | | | | | |
| SERVICE LEVEL 0, PUSH STACK | | | | | | | | | | | | | | |
| 700 | 105 | | | | | | | | | | | | 1 | |
| 701 | 105 | | | | | | | | | | | | 1 | |
| 702 | 105 | | | | | | | | | | | | | 1 |
| 703 | 105 | | | | | | | | | | | | | 1 |
| 704 | 105 | | | | | | | | | | | | | 1 |
| END SERVICE 0, RESET 0, POP STACK | | | | | | | | | | | | | | |
| 105 | | | | | | | | | | | | | | |
| 106 → | | | | | | | | | | | | | | |

NOTE: 1 MEANS SIGNAL IS TRUE.

MULTI-LEVEL PRIORITY MICRO-INTERRUPT CONTROLLER

BACKGROUND OF THE INVENTION

The present invention relates broadly to the field of digital computers and specifically to microprogram controlled computers having a multi-level priority interrupt of the controller.

Digital computer systems typically have a computer program which specifies the particular operation which can occur at one particular moment. In time shared systems, the system has the appearance of running more than one program at the same time. In either environment, however, the computer system must be able to handle interrupts to the operation of the program. These interrupts are most frequently caused by input/output devices requesting some form of service from the processor. The interrupt causes the processor to stop what it is doing and take up the task requested by the interrupting device.

Processing of any given interrupt does take some time. In prior art computers capable of handling a single interrupt at a time, higher priority interrupt conditions may occur during the processing of a lower priority interrupt. Since but one interrupt could be processed at a time, the higher priority interrupt had to wait until the lower priority interrupt was handled. This result is not necessarily acceptable in systems having very high speed input/output devices which need service.

One possible solution to this problem is to design special purpose hardware to handle high speed interrupts directly and not utilize the micro-program at all. In order to do this, however, a considerable amount of hardware is necessary. This is undesirable in machines designed to be small and inexpensive as the increased hardware requires more physical space and increases the cost.

It is accordingly a primary objective of the present invention to provide a multi-level priority micro-interrupt controller for a digital computer system.

It is another objective of the present invention to provide a multi-level priority micro-interrupt controller which is physically small so that the computer itself can be made small compared to prior systems of comparable processing capability.

It is yet another objective of the present invention to provide a multi-level priority micro-interrupt controller which is implemented with few circuits so that cost of these circuits is small compared to the total cost of the system.

SUMMARY OF THE INVENTION

The present invention includes a micro-program controller which is utilized for purposes of controlling the micro-sequence of the machine. In the event there is an interrupt, the next address which would normally be produced by the controller is forced into a stack and alternative hardware initiates an interrupt handling micro-sequence whose starting address is a function of the priority of the interrupt as well as the nature of the interrupt itself. On completion of any interrupt, the micro-sequencer resumes sequencing at the address at the top of the stack.

The present invention contemplates multiple levels of interrupts thereby permitting an interrupt of a higher priority to interrupt an already initiated interrupt operation of lower priority. In the event a lower priority interrupt occurs during a time when a higher priority interrupt is being processed, the lower priority interrupt is merely deferred until all interrupts of a higher priority have been processed.

DESCRIPTION OF THE DRAWINGS

The foregoing and other objects, advantages and features are described below in connection with the drawings which form a part of the original disclosure wherein:

FIG. 4, comprising FIGS. 4A and 4B is a detailed circuit diagram of the circuitry for performing the multilevel interrupt of the present invention.

DETAILED DESCRIPTION

Figure 1:
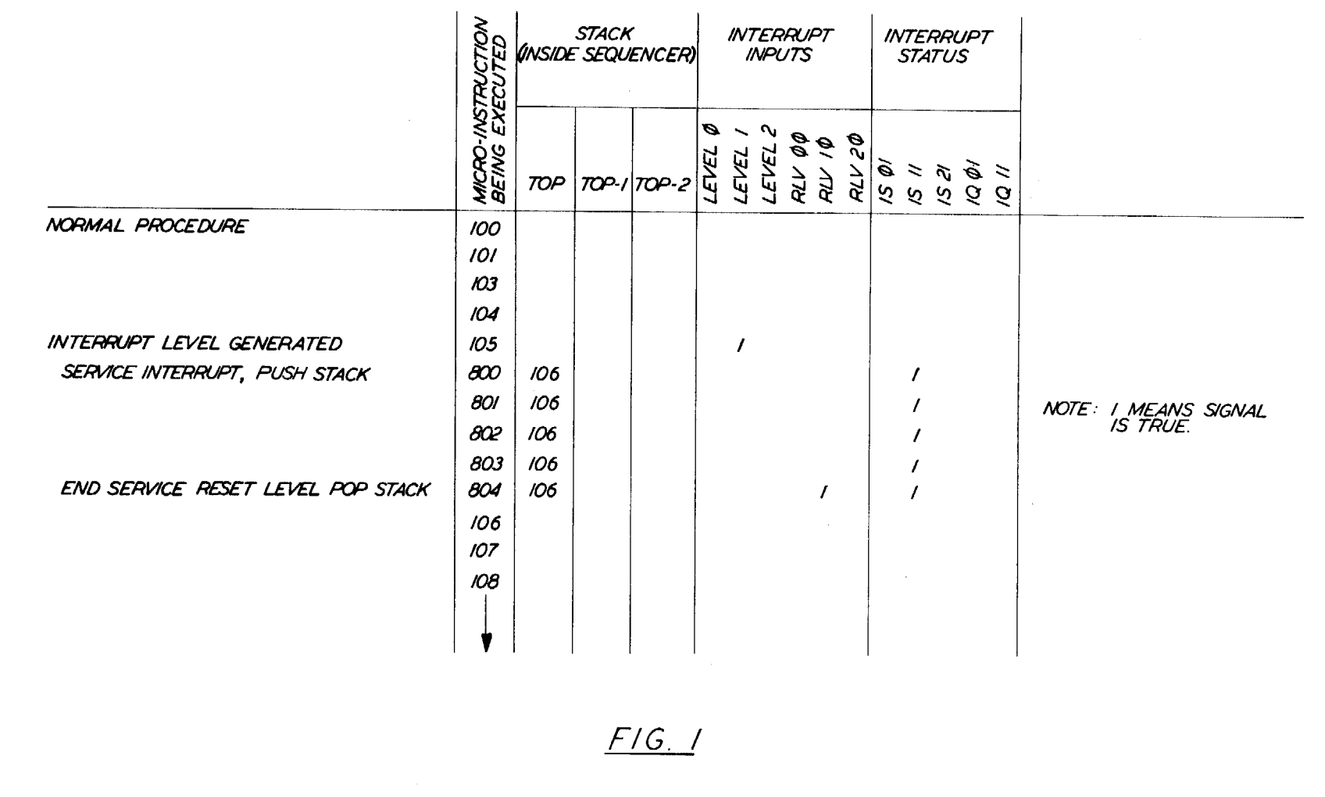
FIG. 1 illustrates the micro-machine operation of the present invention when a single interrupt is processed.

In a micro-program controlled computer, a micro-sequencer is frequently employed to assist in addressing the next control store address in sequence. In such an arrangement, it is not unusual for the micro-sequencer to cause a series of micro-instructions to be executed wherein the address of these micro-instructions are one following the other. As illustrated in FIG. 1, for example, a micro-program sequence may begin with a starting address of 100. Once that micro-instruction has been executed by the machine, the micro-sequencer then calls for the instruction at location 101 to be executed. This procedure will continue, for example, until such time as execution of the instruction at location 105 is in process. At this time, it is assumed that an interrupt is generated having a priority level of 1. When this occurs, the machine, according to the present invention, causes the next micro-sequence address to be placed into a pushdown stack and the starting address of the micro-sequence for processing the particular interrupt is forced to be applied to the control storage address. For the example illustrated in FIG. 1, this starting address is 800. The interrupt processing continues until micro-instructions 801–804 have been executed. During the micro-instruction at location 804, the state of the machine is changed so as to end the service to the interrupt of priority level 1 and to take the address of the next micro-instruction from the top of the stack. Accordingly, the micro-sequence resumes with the micro-instruction at address 106.

Figure 2:
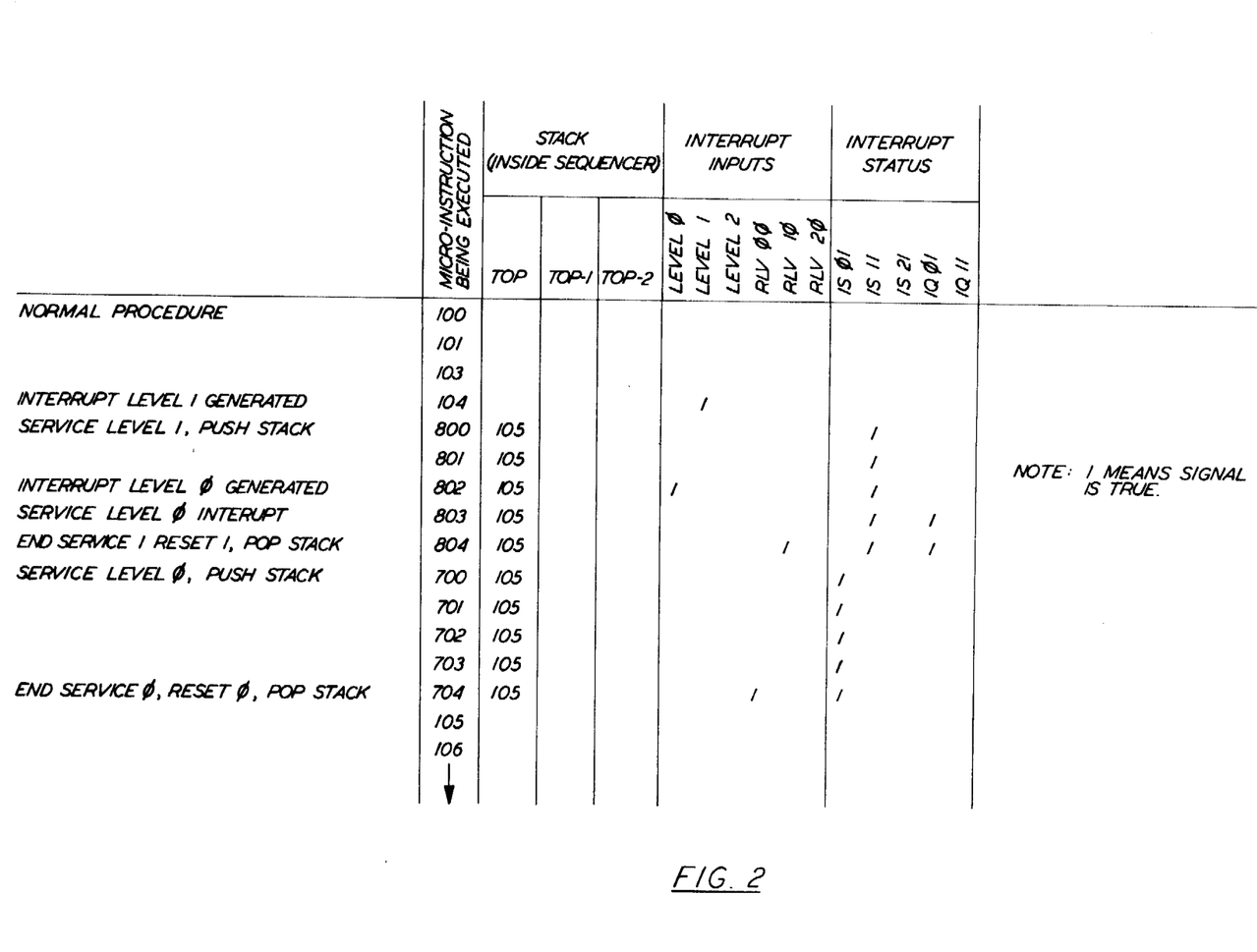
FIG. 2 illustrates the micro-machine operation of the present invention when a high priority interrupt occurs followed by another one of lower priority.

The circuit, according to the present invention, operates differently under different interrupt situations. As illustrated in FIG. 2, the micro-sequence may start with the instruction at location 100 and proceed through location 104 in the manner described in connection with FIG. 1. At this time, it is assumed that an interrupt having a priority level of 1 occurs. This, as discussed before, causes the next address (105) to be placed into the top of the stack and execution of the priority level 1 interrupt begins at location 800. This proceeds, in the hypothetical example of FIG. 2, until execution of the instruction at location 802 occurs. At this time, it is assumed that an interrupt of priority level 0 occurs. Since the priority level is lower than the level of the interrupt already being executed, this interrupt simply is queued. When service of the priority level 1 interrupt is completed during execution of instruction 804, the queued interrupt for the priority level 0 interrupt is recognized and the micro-sequencer causes the starting address for servicing the interrupt priority level 0 to be executed next. Accordingly, instruction 700–704 are executed during service of the interrupt of priority level 0. During the execution of instruction 704, service is completed on the priority 0 interrupt and, since no other interrupt is pending, the micro-sequence of the original program is resumed at location 105 which is the address taken from the top of the stack.

Figure 3:
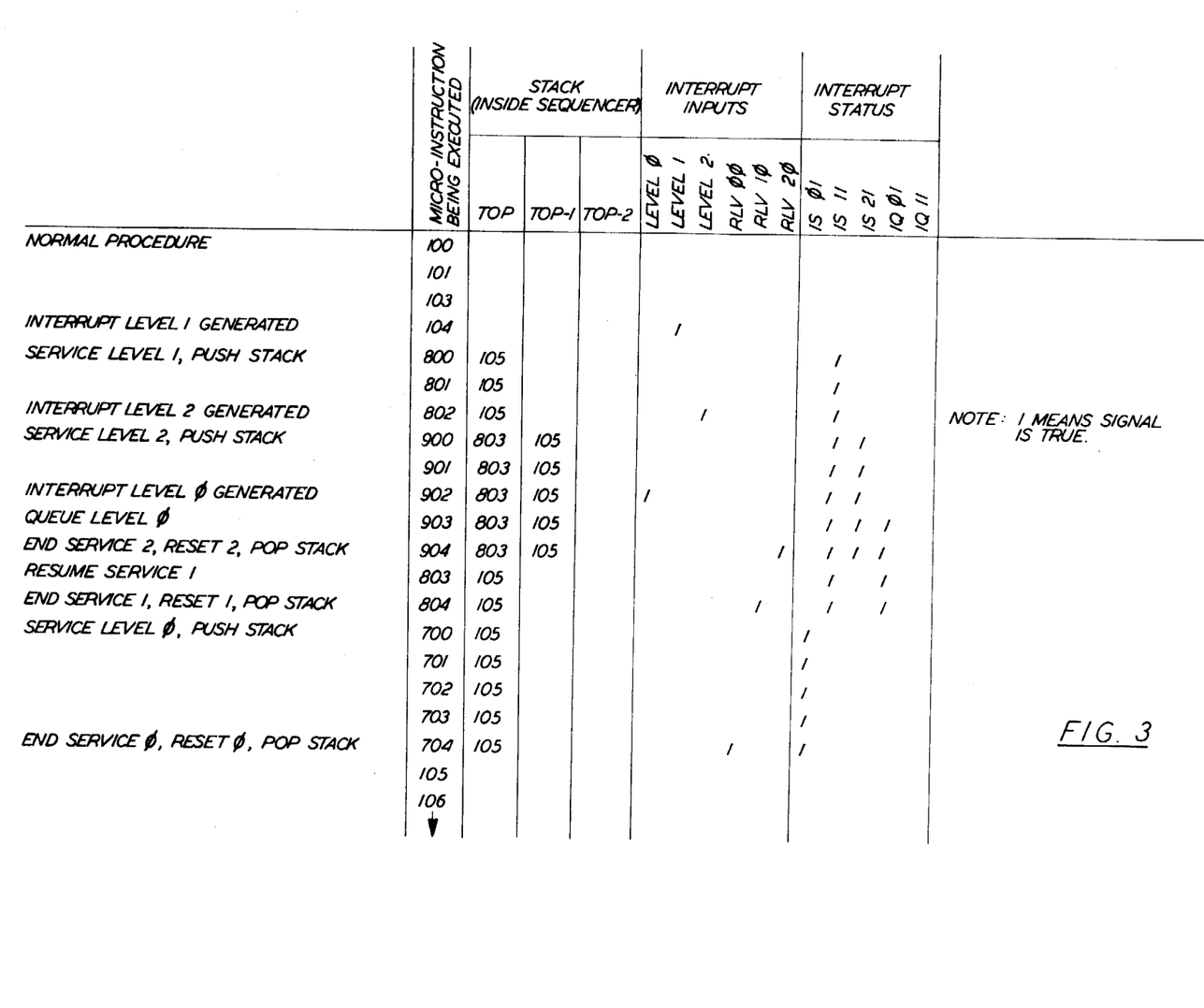
FIG. 3 illustrates the micro-machine operation of the present invention when one interrupt occurs at level 1 followed by a level 2 interrupt before the level 1 interrupt is complete and then a level 0 interrupt occurs.

FIG. 3 illustrates a sequence where a higher priority level interrupt actually interrupts the processing of a lower priority interrupt. In this example, the sequence beings again at micro-instruction 100 and proceeds through micro-instruction 104. During execution of instruction 104, a priority of level 1 is assumed to occur. As previously discussed, when this happens, the starting address of the routine for processing the priority of level 1 is forced to be executed while the next instruction of the sequence previously being executed is placed into the top of the stack. In this example, the instruction following 104 is 800, which is the starting address of the level 1 interrupt handling routine, and the address 105 is put into the stack as this would have been executed following 104 had it not been for the interrupt.

The handling of the priority level 1 interrupt proceeds from instructions 800 through 802 at which time an interrupt of priority level 2 is assumed to occur. When this happens, the next address of the sequence currently being executed is pushed into the top of the stack and any data previously in the stack is pushed one location further down. Accordingly, the top of the stack at the time when the first instruction (900) for handling interrupt of priority level 2 occurs has the value of 803 in it and the next lower position has the value of 105. The interrupt of priority level 2 proceeds using micro-instructions 900–904 at which time it is complete. At the end of service of the interrupt of priority level 2, the address in the top of the stack is caused to be executed next and all of the stack positions are moved up 1. Accordingly, processing of the interrupt of priority level 1 resumes at location 803 and the top of the stack becomes the address 105.

It should be noted in the example that during the execution of instruction 902, an interrupt of priority level 0 is assumed to occur. Since this interrupt is lower than the interrupt currently being executed, this interrupt is simply queued.

As already noted, once service of the interrupt of priority level 2 is complete, processing resumes with location 803 and continues through location 804 at which time service of the interrupt of priority level 1 is complete.

At this time, since the only interrupt pending is a queued interrupt of priority level 0, the next instruction (700) is forced to be executed as this is the first instruction for handing interrupts of priority level 0. The priority level 0 interrupt is processed by instruction 700–704. During instruction 704, the service of the priority level 0 interrupt is completed and since no further interrupts are pending, the next address to be executed is taken from the top of the stack. As such, processing resumes at instruction 105 which would have been the next instruction had the sequence of interrupts outlined above not begun.

The foregoing description illustrates the operation of the circuitry according to the present invention which is characterized in that the micro-program being executed can be interrupted by interrupts having various priority levels. Indeed, since there are three levels of interrupts which may occur in the machine in accordance with the present invention, it is possible that as many as three interrupts may be in process at any one moment in time although two of them may have been interrupted by higher level interrupts themselves. The circuitry for achieving this result is described below.

Figures 4, 4A:
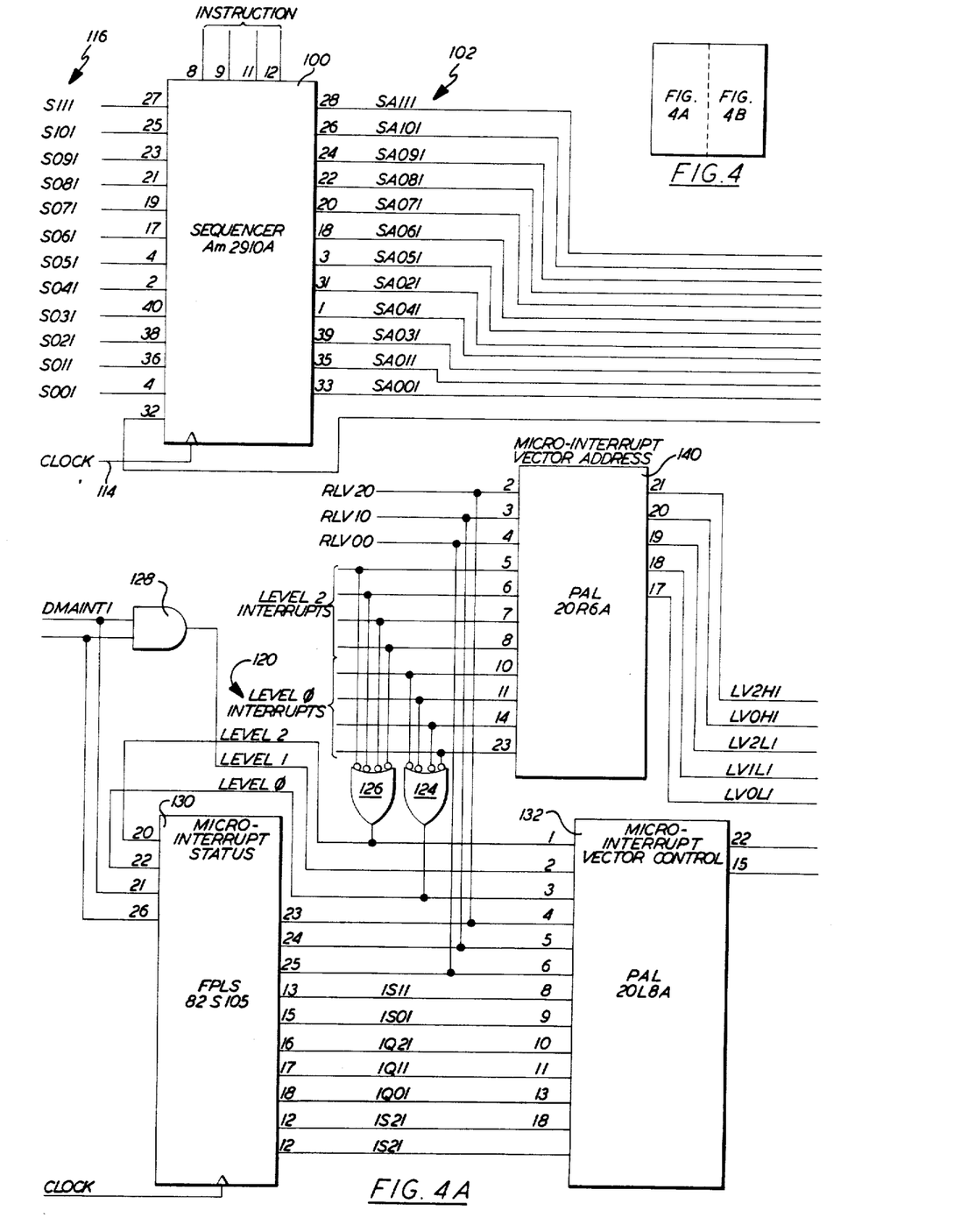
Figure 4B:
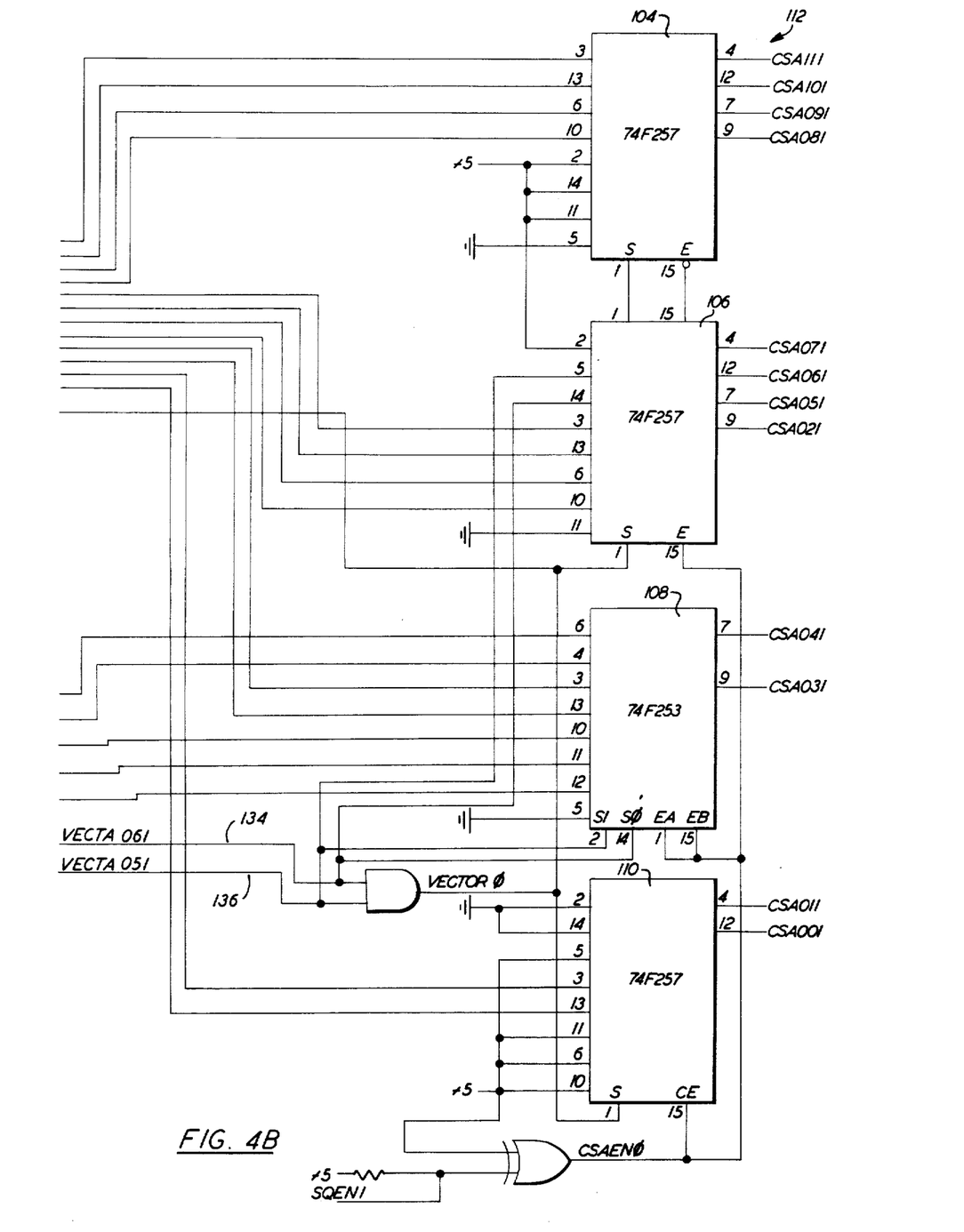

Referring to the detailed circuit diagram of FIG. 4, the circuit according to the present invention includes a sequencer 100 which, in the preferred embodiment, comprises an Advanced Micro-Devices Am2910A. In the normal mode of operation of the machine in accordance with the present invention, the sequencer 100 produces control store addresses on the output lines labeled SA001 to SA111 generally in the area labeled 102. In the preferred embodiment, multiplexors 104, 106, 108 and 110 comprise a 74F257 multiplexor, a 74F257 multiplexor, a 74F253 multiplexor, and a 74F257 multiplexor from Fairchild Camera and Instrument Corporation, Mountainview, Calif., respectively. The address output from the sequencer 100 is normally transferred by the line multiplexers 104, 106, 108 and 110 to the control store address lines labeled CSA001 to CSA111 indicated generally at 112.

Upon the completion of the execution of any given micro-instruction addressed by the address of the control store address bus 112, the sequencer 100 increments the address contained therein so as to cause the sequence to go to the next higher address location in the control store. The incrementing of this address is initiated by a clock pulse on the clock pulse line 114 to the sequencer 100.

In the event that a special branch or some interrupt occurs, the input lines S001–S111 as indicated generally at 116 become active to force the sequencer to produce an address which is different from that which would be produced by simply incrementing the previous address by 1. This will occur, for example, when an interrupt occurs or when a branching function occurs.

In the event that an interrupt occurs, since interrupts are handled by the micro-program control of the present invention, some means must be provided for vectoring to the starting address of the interrupt handling microprogram. This is accomplished in the following manner. Interrupt signals can arise on any of the 4 lines labeled level 0 interrupts indicated generally at 120, any of the 4 lines labeled level 2 interrupts indicated generally at 122 or on the line labeled DMAINT1 (direct memory address interrupt) which comprises the only level 1 interrupt in the system. In the case of the level 0 interrupt 120, each of these lines coupled via an OR gate 124 to the line labeled level 0. The level 0 line will be active whenever a level 0 interrupt is being requested. Level 2 interrupts on the lines 122 are coupled via the OR gate 126 to the line labeled level 2. The level 2 line is active whenever any of the level 2 interrupts are present. The level 1 line goes active when the line DMAINT1 goes active and the second input to AND gate 128 is also high. The second input to AND 128 is normally high except for certain special situations which do not form a part of the present invention and, therefore, are not further discussed.

The particular signals which are applied to the level 0 interrupt lines 120 and the level 2 interrupt lines 122 are carefully selected so that in the normal operation of the computer system according to the invention, no more than one of those lines for each level of interrupt can be active at a particular moment. In other words, all interrupts at a given level are mutually exclusive. This restriction must apply if the circuit is modified to provide more than three levels of interrupts.

Figure 5:
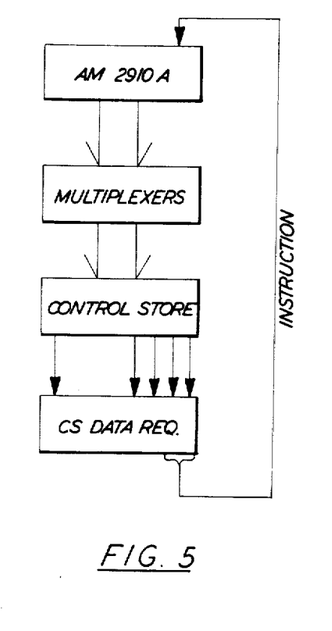
FIG. 5 illustrates the environment of the circuitry of the invention as part of the control storage system of a computer.

Assuming for the moment that one level of interrupt has occured, one of the lines labeled level 0, level 1 or level 2 will be active. These lines are coupled to the micro-interrupt status FPLS 130 (field programable sequencer) and the micro-interrupt vector control PAL 132 (programmed array logic). In the preferred embodiment, FPLS 130 comprises an FPLS 82 S105 from Signetics Corporation, Sunnyvale, Calif. and PAL 132 comprises a PAL 20L8A from Monolithic Memories, Santa Clara, Calif. The PAL 132 is operative to decode the incoming lines to produce signals on the lines labeled VECTA051 and VECTA061. These two lines are at a high level or binary one level when no interrupt is pending. When an interrupt occurs, however, one or the other of the lines 134 or 136 go low. When this condition occurs, the line labeled VECTOR0 also goes low. VECTOR0 going low causes the sequencer 100 to lower the input on pin 32 which thereby prevents the sequencer from incrementing the address contained therein. In addition, the line VECTOR0 going low causes the multiplexors 104, 106, 108 and 110 to prevent the signals on line SA001 to SA111 from being transmitted to the control store address bus 112. On the other hand, the VECTOR0 line going low causes the multiplexors 104, 106, 108 and 110 to gate an address onto the control store address bus 112 which corresponds to the starting address of the micro-sequence for handling level 0, level 1 or level 2 interrupts, depending on the levels on the lines 134 and 136. The starting address is formed in part by the circuitry responsive to signals VECTA061 and VECTA051 as well as by the microinterrupt vector address PAL 140. In the preferred embodiment, PAL 140 comprises a PAL 20R6A from Monolithic Memories, Santa Clara, Calif. As indicated earlier, in the event that a level 0 interrupt occurs, the signals on the line 134 and 136 cause an address of 700 to be placed on the control store address register 112. In the event that a level 1 interrupt occurs, the signals on lines 134 and 136 cause an address of 800 to be placed on the control store address bus 112. In the event a level 2 interrupt occurs, the level of the lines 134 and 136 is such that an address of 900 is placed on the control store address bus 112. Once the address is sent to the control store, as illustrated in FIG. 5, the output of the control store goes into a control store data register. A portion of the control store data register is fed back via the lines labeled instruction to the sequencer. The instruction comprises 4 lines and these are input to the sequencer on pins 8, 9, 11 and 12 as illustrated in FIG. 4. In accordance with the present invention, the first instruction in an interrupt handling micro-routine includes an instruction to the sequencer which causes the next address in the interrupted micro-program sequence to be stored in a push down stack internal to the sequencer 100. In addition, the lines S001–S111 are activated with the starting address of the micro-routine which is placed into a counter in the sequencer 100. The counter is subsequently incremented and the new address is placed on its output bus labeled 102 and this address is then passed by the multiplexors 104, 106, 108 and 110 because the output of the PAL 132 on lines 134 and 136 can remain low only for one machine cycle. Thereafter, the micro-routine which caused the interrupt will continue to be executed until it is complete. During the last cycle of the interrupt handling routine, an instruction is transmitted to the sequencer 100 causing the stack to be "POPed" thereby causing the address previous pushed into the stack to be placed at the output of the sequencer 100 thus causing the instruction which would have been executed prior to the interrupt to be executed after completion of the interrupt.

The logic of the FPLS 130 and the PAL 132 is designed specifically to handle a plurality of situations. These situations have been outlined in general at the beginning of this detailed description. Of particular note, however, is that the logic will permit, in the event that only one level of interrupt occurs at a given time, the particular interrupt to be executed in its entirety. Once the interrupt has been handled, as indicated already, the sequence returns to the next instruction which would have been executed prior to the interrupt having occured.

In the event that multiple interrupts occur, the interrupts have been assigned priority levels and those with the highest level number are executed first. Hence, if an interrupt occured at level 0, 1 and 2 at the same time, the logic of the FPLS 130 and the PAL 132 operates so as to select the micro-sequence for handling the level 2 interrupt. The level 1 and level 0 interrupts in this instance, are queued and will be executed after the higher level microsequence has been completed. Accordingly, for this example, the level 2 interrupt will be processed followed by that of level 1 and then level 0. Once the level 0 interrupt has been completed, the normal sequence resumes.

The logic of the FPLS and the PAL 132 operates so that in the event an interrupt is occurring and a subsequently initiated higher level interrupt is encountered, the first interrupt is itself interrupted and the higher level interrupt is executed to completion. Then, the previously initiated interrupt is completed prior to the micro-sequence returning to the state which prior to any of the interrupts.

Accordingly, the interrupt selection logic is operative to cause the highest level of interrupt to begin execution and the previous operation is suspended although it will be resumed as soon as all higher level interrupts have been completed. In addition, the interrupt selection circuitry causes any interrupt having a level lower than the current interrupt being executed to be queued and execution thereon begins only after all higher level interrupts have been processed.

While the foregoing description has made particular emphasis on the circuit configuration and circuit types illustrated in FIG. 4, it will be clear to those of skill in the art that there are alternative circuits which will perform the same functions as specified above. It will also be recognized by those of skill in the art that the present invention contemplates three levels of interrupt. The present invention, however, is not limited to having only three levels of interrupt. It is perfectly possible to have more levels of interrupt, however, the circuitry must be altered somewhat in order to handle the additional interrupt levels. In doing so, one must keep in mind the rules established by the present invention in that every higher level interrupt can interrupt any lower level interrupt as well as the normal sequence. Further, whenever an interrupt occurs during the processing of a previously initiated higher level interrupt, the lower level interrupt is simply queued and executed only on completion of the higher level interrupt. It must also be recalled that multiple conditions may produce a given level of interrupt, however, in the normal operation of the machine, no more than one condition should produce an interrupt at a given level at any moment.

It will also be observed that throughout the drawings, the circuit components have been assigned standard commercial designations. This has been done purely for clarity and for reader convenience and is not intended as a limitation on the component value or type nor as a restriction on the scope of the invention which is limited only by the scope of the following claims.

What is claimed is:

1. A multi-level priority micro-interrupt controller for handling a plurality of interrupt signals input at a plurality of levels of priority, wherein only one interrupt signal for each level of priority may be active at any moment, which comprises:
  a sequencer comprising:
    (a) incrementer means, in response to a clock signal, for producing successive control store addresses at a sequencer output, by incrementing a first control store address to produce a successive control store address at the sequencer output, said incrementer means being inhibited from incrementing in response to a vector signal,
    (b) means, in response to an interrupt-store signal and a further control store address, for storing the next successive control store address in a push down stack and for providing the further control store address to the incrementor means, and
    (c) means, in response to an interrrupt-done signal, for removing an address from the top of the push down stack and producing it at the sequencer output;
  means, responsive to said plurality of input interrupt signals, for producing an interrupt-handle signal for each priority level;
  means, responsive to said interrupt-handle signals, for producing an interrupt-queued signal for each interrupt signal input while an input interrupt signal of higher priority is being handled and an interrupt-status signal for each input interrupt signal being handled;
  a vector address generator, responsive to said plurality of input interrupt signals, for producing a first at least part of a control store address of a subroutine for handling an input interrupt signal for the input interrupt signal having the highest level of priority of those input;
  a vector control, responsive to said interrupt-handle signals, said interrupt-status signals and said interrupt-queued signals, for producing a second at least part of a control store address of a subroutine for handling an input interrupt signal for the input interrupt signal having the highest level of priority of those input and which have not yet been handled when no input interrupt signal of higher priority is being handled;
  means, responsive to said second at least part of a control store address, for producing the vector signal;
  multiplexor means, responsive to the sequencer output, the first and second at least part of a control store address, and the vector signal, for producing as controller output, the sequencer output when the vector signal has a first value or a control store address formed in response to the first and second at least part of a control store address when the vector signal has a second value;
  means for applying the interrupt-store signal and the control store address of a subroutine for handling an input interrupt signal, as a further control store address, to the sequencer; and
  means for applying the interrupt-done signal to the sequencer after the input interrupt signal has been handled.

2. The controller of claim 1 further comprising means for applying said interrupt-done signal to said means for producing an interrupt-queued signal.

3. The controller of claim 2 wherein the means for applying the interrupt-store signal comprises means for executing the first instruction in the subroutine for handling an input interrupt signal.

4. The controller of claim 3 wherein the means for applying the interrrupt-done signal comprises means for executing the last instruction in the subroutine for handling an input interrupt signal.

* * * * *